(12) United States Patent
Fischer et al.

(10) Patent No.: US 8,486,209 B2
(45) Date of Patent: Jul. 16, 2013

(54) METHOD FOR THE PRODUCTION OF A BREATHABLE MULTILAYER SYNTHETIC LEATHER, AND BREATHABLE MULTILAYER SYNTHETIC LEATHER

(75) Inventors: Bernd Fischer, Murr (DE); Marcus Wetzel, Dettingen (DE); Birgit Kammerer, Kupferzell (DE); Sonja Kaspar, Krautheim-Neunstetten (DE)

(73) Assignee: Konrad Hornschuch AG, Weissbach (DE)

( * ) Notice: Subject to any disclaimer, the term of this patent is extended or adjusted under 35 U.S.C. 154(b) by 912 days.

(21) Appl. No.: 12/310,099

(22) PCT Filed: Aug. 7, 2007

(86) PCT No.: PCT/EP2007/006946
§ 371 (c)(1),
(2), (4) Date: Aug. 17, 2009

(87) PCT Pub. No.: WO2008/017446
PCT Pub. Date: Feb. 14, 2008

(65) Prior Publication Data
US 2009/0311480 A1 Dec. 17, 2009

(30) Foreign Application Priority Data

Aug. 9, 2006 (EP) .................... 06016612

(51) Int. Cl.
*B29C 65/52* (2006.01)
*B29C 41/32* (2006.01)
*B29C 41/46* (2006.01)

(52) U.S. Cl.
USPC ............ 156/77; 156/78; 156/246; 156/247

(58) Field of Classification Search
USPC ............................ 156/77, 78, 246, 247, 719
See application file for complete search history.

(56) References Cited

U.S. PATENT DOCUMENTS

| 3,751,329 A | 8/1973 | Fonzi et al. |
| 3,794,548 A * | 2/1974 | Wirth et al. ................ 428/91 |
| 3,941,633 A * | 3/1976 | Wang et al. ................ 156/77 |
| 4,017,656 A * | 4/1977 | Lasman et al. ................ 428/86 |
| 2003/0017322 A1* | 1/2003 | Kim ................ 428/315.7 |
| 2005/0181124 A1* | 8/2005 | Hoersch ................ 427/176 |

FOREIGN PATENT DOCUMENTS

| DE | 259 106 A3 | 4/1984 |
| EP | 1 279 762 A2 | 1/2003 |
| GB | 1117932 | 11/1969 |
| WO | WO 2004/061198 A1 | 7/2004 |
| WO | WO 2005/047549 | 5/2005 |

* cited by examiner

*Primary Examiner* — Michael Tolin
(74) *Attorney, Agent, or Firm* — Pauley Petersen & Erickson

(57) ABSTRACT

A method for the production of a breathable multilayer synthetic leather with a backing layer of a textile sheet, at least one intermediate layer applied to the backing layer and based on an at least to some extent open-cell whipped polyurethane foam and, applied full-surface to the at least one intermediate layer, an outer layer based on a polyurethane.

27 Claims, 3 Drawing Sheets

METHOD FOR THE PRODUCTION OF A BREATHABLE MULTILAYER SYNTHETIC LEATHER, AND BREATHABLE MULTILAYER SYNTHETIC LEATHER

BACKGROUND OF THE INVENTION

1. Field of the Invention

This invention relates to a method for the production of a breathable multilayer synthetic leather with a backing layer of a textile sheet, at least one intermediate layer based on an at least partially open-cell whipped polyurethane foam that is applied to the backing layer, and an outer layer based on a polyurethane that is applied to the entire surface of the at least one intermediate layer, where, in a first step, the outer layer is applied to the entire surface of a detachable underlay and hardened, the at least one intermediate layer is applied to the outer layer, then the backing layer is laid onto the at least one intermediate layer, and the underlay is detached from the outer layer.

2. Discussion of Related Art

Methods for the production of synthetic leathers are known, for example, from German Patent Reference DD 259 106 A3 and are distinguished by the fact that the layers are produced using the so-called reverse process, wherein, first the subsequent visible surface, such as the top surface of the outer layer, is formed on the supporting surface of the underlay and then the remaining layers are applied until finally, the backing layer is applied, which will later form the underside of the finished synthetic leather. After the entire layer structure has been formed, the underlay is detached from the outer layer so that the visible side is accessible, the finished synthetic leather is turned over and the outer layer can then be provided with an embossing or other additional surface treatment.

Breathable multilayer synthetic leathers are particularly suitable for use in automotive interiors, for example as seat covering material, because the breathable property assures greater seat comfort and prevents perspiration on a vehicle seat covered with the material.

While the textile sheet backing layers and the whipped polyurethane foams used for the intermediate layers are inherently accompanied by a certain open-porosity that is necessary for achieving the breathability, it has been difficult to produce a porous, full-surface polyurethane-based outer layer because the polyurethane dispersions that are applied to an underlay in the reverse process usually tend, as they harden, to form a closed film that lacks the very pores desired, making it necessary to produce pores in the outer layer in an additional work step, such as with needle perforation or stretching. But this is not only laborious, it also influences the visual appearance of the outer layer because the pores produced by needle perforation are easily visible to the naked eye.

European Patent Reference EP 1 279 762 discloses the production of a breathable synthetic leather of the type mentioned above, but the film formation in the outer layer prevents a porosity required for the breathability. If the known synthetic leather is to have a porous and therefore breathable outer layer, then the outer layer is not applied to the entire surface, but is instead introduced into recesses of an underlay structured like leather so that openings are produced between the outer layer regions formed in the recesses. A synthetic leather of this kind has many disadvantages, for example a low abrasion resistance of the outer layer.

PCT International Publication WO 2005/047549 discloses an application of a finishing layer of an aqueous plastic dispersion onto a structured underlay heated to a temperature below 105° C. in order to form a film after the evaporation of the water. The layer thus produced has some pores, but the breathability, particularly with regard to the number and size of the pores, allows for improvement due to the film formation.

SUMMARY OF THE INVENTION

One object of this invention, is to provide a method for the production of a breathable multilayer synthetic leather of the type mentioned but while saving on additional work steps, makes it possible to produce a multilayer synthetic leather that is breathable specifically due to its having an outer layer that is open-pored, but applied to the entire surface. Not only should this synthetic leather be produced in a particularly efficient manner, but also, the pores that are produced should be so small that they do not detract from the visual appearance of the synthetic leather.

In order to attain this object, this invention proposes the embodiment of a method for the production of a breathable multilayer synthetic leather according to characteristics set forth in this specification and in the claims.

According to this invention, to form the outer layer, an aqueous aliphatic polyurethane dispersion serving as a base for the outer layer is applied in liquid form to the entire surface of the underlay and immediately after the application of the polyurethane dispersion, the water content of the dispersion is evaporated through the supply of heat within a time interval of less than 5 s so that a filming-free drying of the polyurethane dispersion on the underlay is produced during formation of the outer layer with micropores.

A "full-surface application or formation" of the outer layer is understood in the context of this invention to be an application onto the underlay over its entire surface, without gaps or uncovered regions or a covering of the entire surface of each intermediate layer or intermediate layers.

The micropores produced in the outer layer in the context of this invention have pore sizes that permit water vapor to pass through, but prevent or at least delay the entry of liquid water. The method according to this invention can easily produce pore sizes in the range from 10 to 80 μm, but it is also possible to produce larger pore sizes or diameters.

According to this invention, the aqueous aliphatic polyurethane dispersion used to form the microporous outer layer is applied in a known way to an underlay with separating properties. A supply of heat is provided that is sufficiently intense to dry the polyurethane dispersion suddenly, thus either preventing the dispersion from forming a film or immediately destroying a film as it is formed.

Whereas up to now, the approach has always been to strive for a filming of the outer layer, with the resulting film being provided with pores subsequently or during the film formation, this invention takes a different approach in which it uses the sudden drying in order to avoid any film formation. The aqueous polyurethane dispersion is applied to the underlay in the form of discrete droplets by suitable application methods. As a result of the high temperature of the underlay, each droplet immediately dries, preventing neighboring droplets from running, such as preventing a film formation.

In the context of this invention, "sudden drying" is understood to be a drying of the aqueous aliphatic polyurethane dispersion applied to the underlay that occurs within a time interval of less than 5 s, for which purpose a heating of the dispersion to approximately 175 to 200° C. within this interval is considered to be advantageous. This can be achieved through a corresponding heating of the underlay to at least 175° C. At such temperatures, the polyurethane dispersion used is not yet subjected to any mechanical damage, but the evaporation of the water content occurs fast enough to achieve the desired filming-free drying of the dispersion. Naturally, depending on the aqueous aliphatic polyurethane dispersion used to form the outer layer, it is possible to select higher or lower temperatures, so long as the temperature resistance of the polyurethane dispersion used permits.

With the application of the aqueous aliphatic polyurethane dispersion in liquid form, the powerful supply of heat causes the individual droplets of the dispersion to be almost instantaneously fixed to the underlay at their respective edges due to the evaporation of the water content so that the individual discrete droplets are largely or completely prevented from running and joining together. As a result, the desired micropores, which are required for achieving the breathability of the outer layer thus produced, form between the individual droplets. Consequently, the method according to this invention makes it possible to dispense with a subsequent work step for mechanically producing pores, such as a needle perforation or stretching. In addition, the micropores produced are so small that they are difficult or entirely impossible to see with the naked eye, giving the breathable multilayer synthetic leather produced with the method according to this invention a particularly advantageous visual appearance.

Preferably, a polyurethane dispersion that has a solids content of 30 to 60% is used to produce the outer layer.

The application of the aqueous aliphatic polyurethane dispersion in liquid form to the underlay can be carried out in several variants according to the method of this invention.

According to one embodiment of this invention, the polyurethane dispersion for producing the outer layer is sprayed in the form of fine droplets onto the entire surface of the underlay by spray nozzles. A spray application of this type can be carried out on a smooth underlay as well as on an underlay that has already been embossed.

The conventional spraying methods such as airless, Airmix, HVLP (high volume low pressure), or flow pressure are suitable for the spray application of the polyurethane dispersion.

Another application alternative according to this invention is for the polyurethane dispersion for producing the outer layer to be printed onto the entire area of the underlay. Suitable methods for this include halftone printing or screen printing, for example. For their part, the printing methods assure that aqueous polyurethane dispersion used to form the outer layer is applied to the underlay in the form of dispersed droplets so that the sudden drying through the powerful supply of heat can reliably take place in the above-described manner.

It is also possible to apply a thin layer of the aqueous polyurethane dispersion, such as by the reverse gravure application printing method, in which the sudden drying according to this invention likewise produces the desired pores.

The underlay used to produce the outer layer can be embodied in the form of a belt and can optionally revolve endlessly. In this case, it is also preferably guided over at least one heated roller in order to heat the underlay to a temperature suitable for evaporating the water content of the applied polyurethane dispersion. The supply of heat to the applied aqueous polyurethane dispersion for the sudden evaporation of the water content of the dispersion therefore takes place via the application onto an underlay previously heated to suitable temperatures.

Alternatively or in addition, the polyurethane dispersion applied to the underlay can also be heated by infrared radiation and/or microwaves in order to evaporate the water content so as to achieve the filming-free drying on the underlay during the formation of the outer layer with micropores.

In this case, the heat should be supplied solely from the underlay side so that on the side of the forming outer layer oriented away from the underlay, no filming occurs that would inhibit or even prevent the continued evaporation of the water content from the polyurethane dispersion.

An underlay in the form of a belt also permits an at least partially continuous, but preferably continuous, process sequence for the production of the synthetic leather according to this invention.

Depending on the application method used, the outer layer can be applied into the underlay in a thickness of from 5 to 150 µm.

The dry film weight of the outer layer lies in the range from 10 to 50 g/m2, preferably from 30 to 40 g/m2.

Particularly when the polyurethane dispersion is sprayed onto the underlay, dry film weights of from 30 to 40 g/m2 are ideal. Using the method according to this invention, it is possible to obtain a sufficient number of micropores in the outer layer even at dry film weights of up to 50 g/m2.

The underlay used can, for example, be a plastic film that easily detaches from the formed outer layer, a siliconized textile sheet, a siliconized paper, or also a metallic substrate such as a stainless steel belt.

As mentioned above, depending on the specific use, the underlay can be smooth or can also be provided with a surface profiling in order to immediately give the outer layer being formed on the underlay a corresponding surface profiling, such as in the form of a desired leather grain.

To further accelerate the evaporation of the water content of the aliphatic polyurethane dispersion, it is possible for the polyurethane dispersion to additionally contain water-miscible low-boiling organic solvents in order to accelerate the evaporation that results from the supply of heat.

After the outer layer has been produced in the above-explained way through filming-free drying of the applied polyurethane dispersion over the entire surface of the underlay, at least one intermediate layer in the form of an open-pored whipped polyurethane foam is applied to the outer layer or, in the case of multiple intermediate layers, to the previously applied intermediate layer, and in fact, is preferably applied by a spreading blade. Thus, the basic dispersions are mixed with foam stabilizers for producing an open-cell foam, optional flame retardant, and other additives and are whipped with air to the desired foam weight. The foam weight in this case influences the air permeability and mechanical stability.

With the breathable synthetic leather according to this invention, the use of at least one whipped foam intermediate layer achieves a significant degree of independence from which backing material is used because the whipped foam intermediate layer always produces a good attachment between the backing material and the outer layer.

If only one intermediate layer is used, it preferably has a foam weight of from 200 to 700 g/l, preferably from 300 to 600 g/l, and even more preferably from 400 to 500 g/l and is applied onto the outer layer with a spreading blade to a thickness of from 200 to 1000 µm.

If two intermediate layers are applied with a spreading blade one after the other, first to the outer layer and then to the first intermediate layer produced, then preferably, the intermediate layer that is applied with a spreading blade directly to the outer layer has a higher foam weight than the second intermediate layer that is applied to the first, which can also be referred to as a laminating coat.

In such a case, however, the two intermediate layers preferably, but not necessarily, have the same thickness. A thickness range from 200 to 800 μm for the intermediate layers appears to be reasonable.

The first intermediate layer that is applied to the outer layer with a spreading blade then preferably has a foam weight of from 300 to 700 g/l, preferably from 400 to 600 g/l, and the second intermediate layer functioning as a laminating coat has a foam weight of from 200 to 600 g/l, preferably from 300 to 500 g/l.

In order to achieve a sufficient open porosity in the individual intermediate layers, it is preferable to produce average pore sizes of from 100 to 200 μm.

Particularly with the use of a smooth underlay and a subsequent embossing of the multilayer synthetic leather obtained, the whipped foam used for the intermediate layer must have a sufficient strength under embossing conditions. It is thus necessary to assure that no stress cracks occur in the surface during the drying of the intermediate layer, which is usually carried out in an intrinsically known fashion through drying in a conduit equipped with a number of separate adjustable temperature zones.

A further increase in the stability of the intermediate layers used can be achieved by cross-linking them through the addition, for example, of isocyanate or melamine or through the addition of functional fillers such as mineral fillers, fibrous fillers, or plastic powders such as PE.

Those skilled in the art can select the backing layer used in the context of the method according to this invention from a wide array of possible choices, for example, a laid fabric, a woven, a knit, a fleece, or a combination of these. Other possibilities include microfiber fleece, spacer knits/fleeces, or fleeces with pinned tricot. The textile sheet used can also be impregnated, for example with polyurethane, in order to improve the attachment to the intermediate layer.

In any case, it is preferable for the backing layer, after production of the at least one intermediate layer, to be placed onto the intermediate layer on top at a time at which this intermediate layer has not yet completely dried so that the backing layer sinks at least partway into the intermediate layer and becomes embedded in it. Care must be taken here, however, so that the backing layer does not sink too deep into the intermediate layer, which can be controlled through the viscosity of the whipped foam used for the intermediate layer, the lamination pressure, and the drying conditions.

After the detachment of the underlay, the surface of the produced outer layer of the multilayer breathable synthetic leather can have a finish coat applied to it, which can improve the mechanical properties such as scratch resistance and better meet the requirements for the desired surface feel. For example, an anilox roller can be used to apply the finish coat.

As mentioned above, after the detachment of the underlay, the surface of the multilayer breathable synthetic leather produced can be embossed, for example with a leather grain. Vacuum embossing is particularly suitable for this because the low embossing pressure and the longer contact time of the surface with the embossing roller result in better retention of the foam structure and in addition, the negative pressure causes pores to open and capillaries to form, both of which benefit the breathability of the synthetic leather produced. Furthermore, an additional opening of pores and capillaries can be achieved through the use of a particularly sharp-edged embossing profile. The embossing of the synthetic leather produced also offers the advantage of not having any subsequent work steps that can impair the embossing result as can be the case, for example, with the use of an embossed underlay and subsequent layer application.

This invention also relates to a multilayer breathable synthetic leather with a backing layer of a textile sheet, at least one intermediate layer based on an at least partially open-cell whipped polyurethane foam that is applied to the backing layer, and an outer layer based on a polyurethane that is applied to the entire surface of the at least one intermediate layer.

In order to attain the initially stated object of a particularly economical production with good breathability and simultaneously advantageous visual appearance, the multilayer breathable synthetic leather according to this invention has an outer layer embodied with micropores due to the filming-free drying of an aqueous aliphatic polyurethane dispersion.

The outer layer of such a multilayer breathable synthetic leather preferably has a thickness from 5 to 150 μm and has a dry film weight of from 10 to 50 g/m2, preferably from 30 to 40 g/m2.

Other features of the multilayer breathable synthetic leather are taught in this specification and in the claims.

BRIEF DESCRIPTION OF THE DRAWINGS

The method according to this invention and the multilayer breathable synthetic leather produced according to the method will be explained in greater detail below in conjunction with exemplary embodiments and with reference to the accompanying drawings, wherein.

DETAILED DESCRIPTION OF THE INVENTION

Figure 1:
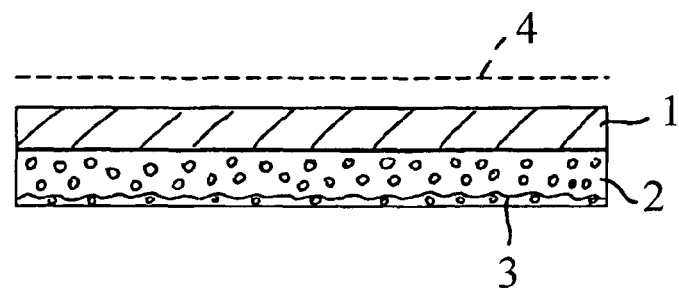
FIG. 1 shows an enlarged, schematic section view taken through a first embodiment of a multilayer breathable synthetic leather according to this invention.

FIG. 1 shows a cross section view taken through a multilayer breathable synthetic leather, which is equipped, starting from its top surface or visible surface, with an outer layer 1 based on a polyurethane, which is adjoined by an intermediate layer 2 composed of an open-cell whipped polyurethane foam, and a backing layer 3 composed of a textile sheet that is embedded in the intermediate layer 2.

Whereas the textile sheet 3 and the intermediate layer 2 composed of open-cell whipped polyurethane foam are intrinsically open-pored and therefore breathable, the outer layer is produced as described in greater detail below from an aqueous aliphatic polyurethane dispersion through sudden drying of the dispersion in a filming-free manner on an underlay in the so-called reverse process so that the outer layer is porous, with micropores that have a diameter of from 10 to 70 μm, thus rendering the entire composite breathable. The surface of the outer layer 1 can optionally have a finish layer 4 and/or the composite can have a surface profiling, for example an embossing with a leather grain.

Figure 3:
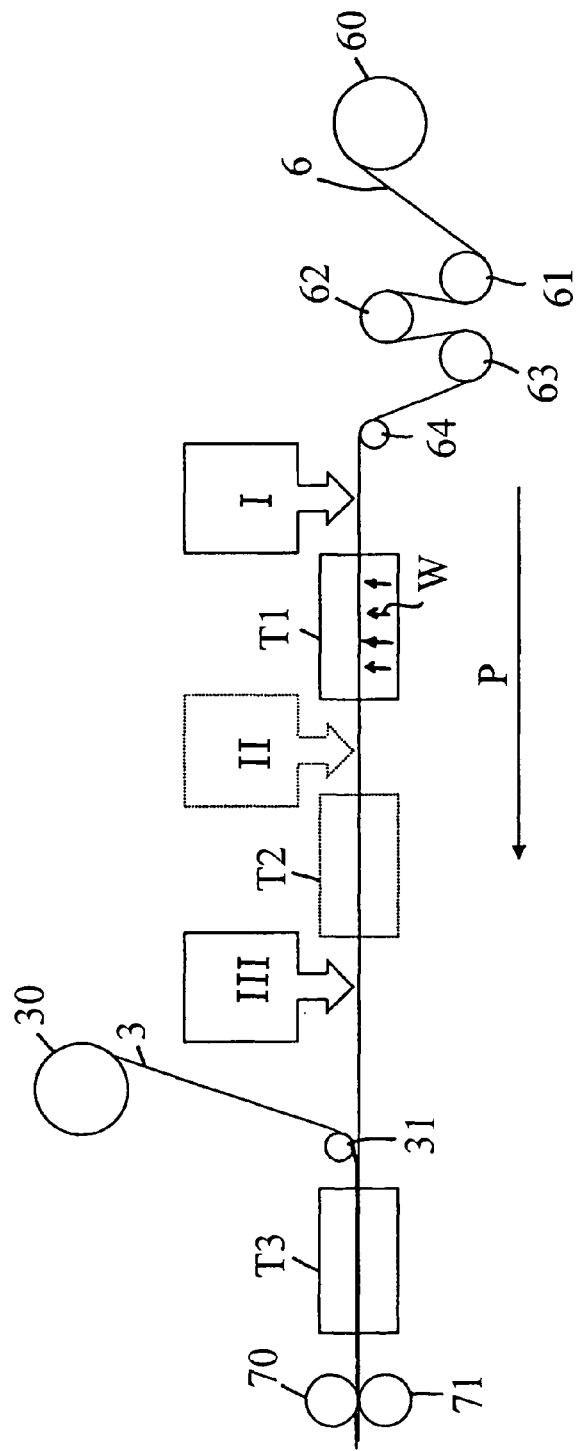
FIG. 3 is a schematic view of the production of a multilayer breathable synthetic leather according to this invention.

The production of a multilayer breathable synthetic leather is schematically shown in FIG. 3.

As mentioned above, this production occurs using the so-called reverse process, for example first, the subsequent outer layer 1 is produced and applied, in fact to an underlay 6 that can be detached from the subsequent outer layer 1, then the intermediate layer 2 is produced and applied, and finally, the subsequent backing layer 3 is produced and applied.

In FIG. 3, the production direction is indicated by arrow P.

First, a suitable substrate functioning as an underlay 6 travels from a storage roll 60 to the apparatus shown. The underlay 6 can be composed of a siliconized paper, for example, and can be either smooth or can already have an embossing, such as a leather grain.

The underlay 6 first passes over several rollers 61, 62, 63, which are heated, so that the underlay is heated to a surface temperature of preferably 175 to 200° C. when it is guided over the supply roller 64.

At an application station labeled I, an aqueous aliphatic polyurethane dispersion in liquid form for producing the outer layer is sprayed by spray nozzles, in the form of dispersed droplets onto the entire surface, for example so that it completely covers the underlay 6 that has been heated in the above-explained way. Because of the previously executed heating of the underlay 6, a sudden evaporation of the water content of the aqueous polyurethane dispersion and/or of other solvents contained therein occurs and the applied polyurethane dispersion dries without forming a film, within an interval of less than 5 s.

In addition to the supply of heat by the heated underlay 6, in a first drying chamber T1, an auxiliary heat supply can be provided, for example by infrared radiation W which takes place from the underside of the underlay 6 in order not to hinder the evaporation of the water content and solvents optionally contained in the polyurethane dispersion.

Because of this sudden drying that occurs in an extremely short interval of time, the individual spray-applied droplets of the aqueous polyurethane dispersion are prevented from running together, thus reliably counteracting a film formation of the outer layer 1 that the spray-applied polyurethane dispersion is producing, and consequently, the outer layer 1 formed at the beginning of the drying chamber T1 is provided with micropores that have a pore size of from 10 to 70 μm or greater, for example.

The outer layer thus produced preferably has a thickness of from 20 to 100 μm and a dry film weight of from 30 to 40 g/m2.

The microporous outer layer 1 thus produced on the underlay 6 then travels to a processing station III, where a whipped polyurethane foam, which is previously prepared in an intrinsically known way and has a foam weight of from 200 to 700 g/l, preferably from 300 to 600 g/l, even more preferably from 400 to 500 g/l, is applied to the outer layer with a spreading blade, to a thickness of from 200 to 1000 μm.

Then the backing layer 3 in the form of a suitable textile sheet is supplied from a storage roll 30 via a deflecting roll 31 and placed into the not yet fully dried whipped polyurethane foam for forming the intermediate layer 2. Because of the incomplete drying of the intermediate layer 2, the backing layer 3 sinks at least partway into the intermediate layer 2 and becomes embedded in it, as shown in FIG. 1. Then the composite travels through an additional drying chamber T3 and is drawn out between withdrawing rolls 70, 71 and supplied to an additional processing step.

This additional processing particularly includes the removal of the underlay 6 from the outer layer 1, thus uncovering the visible side of the outer layer 1 and top surface of the completed multilayer breathable synthetic leather.

After this removal of the underlay 6, the top surface of the outer layer 1 can optionally have a finish coat 4 and/or with an embossing in order to produce a leather grain or the like.

Figure 2:
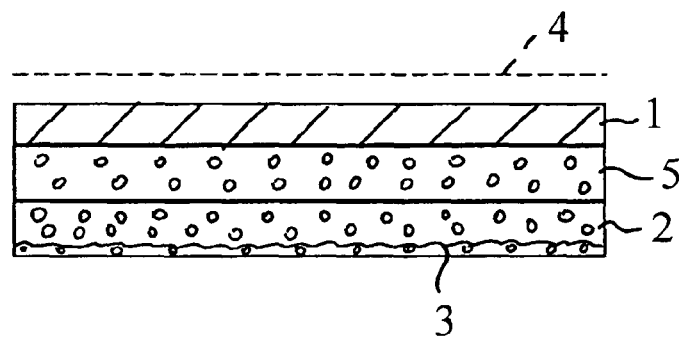
FIG. 2 shows a section view taken through another embodiment of a multilayer breathable synthetic leather according to this invention.

In an alternative exemplary embodiment according to FIG. 2, in which elements that remain the same have the same reference numerals, the breathable synthetic leather includes not only an intermediate layer 2, but also another intermediate layer 5 that is additionally provided between the outer layer 1 and the intermediate layer 2.

As shown in FIG. 3, only after the production of the outer layer 1 on the underlay 6 is this additional intermediate layer 5 produced in an optionally provided additional processing station II. This intermediate layer 5 is also produced by applying an open-pored whipped polyurethane foam with a spreading blade, followed by a drying process in an associated drying chamber T2.

The production of this intermediate layer 5 is then followed by the above-described application of the intermediate layer 2 in the processing station III and the subsequent application of the backing layer 3 in the above-explained manner as well as the further processing of the resulting multilayer breathable synthetic leather.

In an exemplary embodiment, an aqueous aliphatic polyurethane dispersion for the formation of the outer layer 1 was formed from a hard component in the form of an anionic aliphatic polyester polyurethane dispersion with a solids content of approximately 40% mixed with a soft component in the form of an anionic aliphatic polyester polyurethane dispersion with a solids content of approximately 40% in a ratio of approximately 80:20 parts by weight, which additionally contained 10 parts by weight of aluminum hydroxide as a flame retardant, 35 parts by weight of water, 5 parts by weight of ethanol as a solvent, and 5 parts by weight of a pigment dispersion, and was sprayed onto a smooth separating paper at a paper surface temperature of 176° C. using the HVLP process, with a 0.8 mm diameter nozzle, at a material pressure of 0.6 bar, and an atomizing pressure of 1.5 bar in the flat jet head used.

After the filming-free drying of this formed outer layer in a thickness of 33 μm on the underlay, a whipped foam formulation composed of or of an aliphatic aqueous polyurethane dispersion with hard and soft components in a ratio of 80:20 soft component to hard component, 28 parts by weight of aluminum hydroxide as a flame retardant, additives in the form of 4.5 parts by weight of aqueous ammonium stearate, 3 parts by weight of fatty alcohol sulfate, 0.8 parts by weight of acrylate thickener, 0.2 parts by weight of ammonia, and 5 parts by weight of a pigment dispersion was foamed to a foam weight of 500 g/l and applied with a spreading blade onto the produced outer layer 1 to a wet film thickness of 400 μm. After drying, this yielded a remaining foam thickness of approximately 250 μm.

A cotton/polyester tricot was then laminated into the still-wet intermediate layer and after the drying of the whole structure was complete, the structure was removed from the separating paper.

The composite was finish coated, as is customary for use in automotive interiors, and was provided with the desired grain structure using the vacuum embossing method.

The resulting composite had an air permeability of 5.25 l/dm2/min at a testing pressure of 200 Pa, with pores of an average diameter of approximately 60 μm having been formed in the outer layer.

The resulting breathable synthetic leather fulfills the corresponding requirements for use in automotive interiors and its breathability permits it to afford a particular degree of sitting comfort when used as a seat covering, for example.

Figure 4:
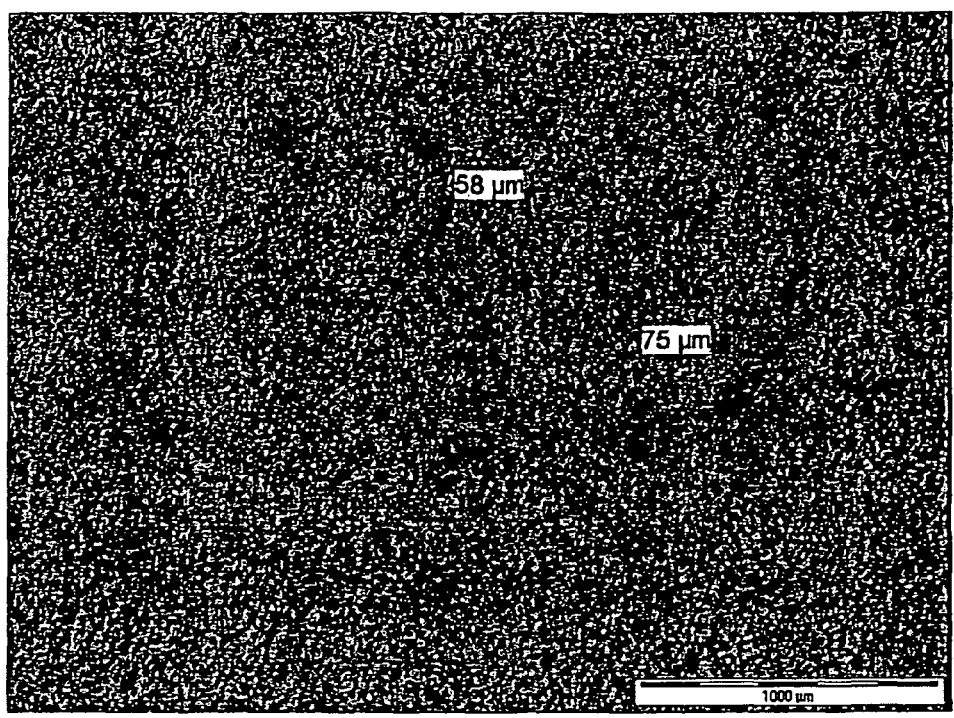
FIG. 4 shows an REM image of an outer layer of a synthetic leather according to this invention.

FIG. 4 shows a very enlarged microscope image of an outer layer produced in the above-described way through sudden drying. The image shows the film-free joining together of individual droplets of the aqueous polyurethane dispersion used, between which micropores are formed. The sample pores measured have diameters of 58 and 75 μm, respectively.

The invention claimed is:

1. A method for the production of a breathable multilayer synthetic leather, comprising the steps of:
   applying an aqueous aliphatic polyurethane dispersion in liquid form to a detachable underlay;
   immediately after application of the polyurethane dispersion, evaporating a water content of the applied dispersion with a supply of heat within a time interval of less than five seconds to cause filming-free drying of the polyurethane dispersion on the underlay and formation of a microporous outer layer;
   hardening the outer layer;
   applying at least one intermediate layer to the outer layer, the at least one intermediate layer comprising at least partially open-cell whipped polyurethane foam;
   applying a backing layer comprising a textile sheet to the at least one intermediate layer; and
   detaching the underlay from the outer layer.

2. The method as recited in claim 1, wherein micropores with a diameter of 10 to 70 μm are produced in the outer layer (1).

3. The method as recited in claim 1, wherein a polyurethane dispersion with a solids content of 30 to 60% is used to produce the outer layer (1).

4. The method as recited in claim 1, wherein the polyurethane dispersion is sprayed onto the underlay (6) in droplet form by spray nozzles to produce the outer layer (1).

5. The method as recited in claim 1, wherein the polyurethane dispersion is printed onto the underlay (6) to produce the outer layer (1).

6. The method as recited in claim 1, wherein the underlay (6) is in a form of a belt, revolves endlessly, and is guided over at least one heated roller to heat the underlay (6) to a temperature suitable for evaporating the water content of the polyurethane dispersion.

7. The method as recited in claim 1, wherein the polyurethane dispersion applied to the underlay (6) is heated by infrared radiation and/or microwaves to evaporate the water content.

8. The method as recited in claim 1, wherein the heat is supplied from the underlay (6) side.

9. The method as recited in claim 1, wherein the outer layer (1) is applied onto the underlay (6) in a thickness of from 5 to 150 μm.

10. The method as recited in claim 1, wherein the outer layer is applied to the underlay (6) with a dry film weight of from 10 to 50 g/m2.

11. The method as recited in claim 1, wherein a plastic film, a siliconized textile sheet, a siliconized paper, a metallic substrate, or a PTFE-coated woven is used as the underlay (6).

12. The method as recited in claim 1, wherein the side of the underlay (6) oriented toward the outer layer (1) has a surface profiling.

13. The method as recited in claim 1, wherein the polyurethane dispersion for producing the outer layer (1) contains water-miscible low-boiling organic solvents.

14. The method as recited in 1, wherein the at least one intermediate layer (2, 5) is applied to the outer layer (1) or to a previously applied intermediate layer (5) by a spreading blade.

15. The method as recited in claim 1, wherein one intermediate layer (2) is used and the intermediate layer (2) has a foam weight of from 200 to 700 g/l, and is applied with a spreading blade to the outer layer (1) to a thickness of from 200 to 1000 μm.

16. The method as recited in claim 1, wherein two intermediate layers (2, 5) are applied one after the other with a spreading blade to the outer layer (1) and to the intermediate layer (5), respectively, each to a thickness of from 200 to 800 μm.

17. The method as recited in claim 16, wherein the first intermediate layer (5) that is applied to the outer layer (1) with a spreading blade has a foam weight of from 300 to 700 g/l, and the second intermediate layer (2) has a foam weight of from 200 to 600 g/l.

18. The method as recited in claim 1, wherein intermediate layers (2, 5) are produced with an average pore size of from 100 to 200 μm.

19. The method as recited in claim 1, wherein the at least one intermediate layer (2, 5) and/or the outer layer (1) each is cross-linked through the addition of an isocyanate or a melamine.

20. The method as recited in claim 1, wherein after the detachment of the underlay (6), a finish coat (4) is applied to the outer layer (1) on a side oriented away from the at least one intermediate layer (2, 5).

21. The method as recited in claim 1, wherein the surface of the outer layer (1) is embossed after the detachment of the underlay (6).

22. The method as recited in claim 21, wherein the surface of the outer layer (1) is embossed by vacuum embossing.

23. The method as recited in claim 21, wherein a sharp-edged embossing profile is used.

24. The method as recited in claim 1, wherein a laid fabric, a woven, a knit, a fleece, or a combination thereof, with or without impregnation, is used as the backing layer (3).

25. The method as recited in claim 1, wherein the backing layer (3) is placed onto the intermediate layer (2) when not yet completely dry so that the backing layer (3) sinks at least partially into the intermediate layer (2).

26. The method as recited in claim 1, wherein the outer layer (1) has a dry film weight of from 30 to 40 g/m2.

27. The method as recited in claim 1, wherein one intermediate layer (2) is provided and the intermediate layer (2) has a foam weight of from 400 to 500 g/l, and has a thickness of from 200 to 1000 μm.

* * * * *